(12) United States Patent
Alachi et al.

(10) Patent No.: US 8,087,003 B1
(45) Date of Patent: Dec. 27, 2011

(54) SYSTEM, METHOD, AND COMPUTER PROGRAM PRODUCT FOR PROPAGATING AN IDENTIFIED DATA VALIDATION ERROR TO A USER INTERFACE

(75) Inventors: Sunil Alachi, Cupertino, CA (US); Samuel Feldman, Cupertino, CA (US)

(73) Assignee: Amdocs Software Systems Limited, Dublin (IE)

( * ) Notice: Subject to any disclaimer, the term of this patent is extended or adjusted under 35 U.S.C. 154(b) by 1023 days.

(21) Appl. No.: 11/871,000

(22) Filed: Oct. 11, 2007

(51) Int. Cl.
*G06F 9/44* (2006.01)
(52) U.S. Cl. .................................................. 717/124
(58) Field of Classification Search .................. 717/124
See application file for complete search history.

(56) References Cited

U.S. PATENT DOCUMENTS

| | | | |
|---|---|---|---|
| 7,222,292 B2 | 5/2007 | Ali et al. | 715/501.1 |
| 7,769,698 B2* | 8/2010 | Matic | 705/77 |
| 2004/0194069 A1* | 9/2004 | Surasinghe | 717/136 |
| 2004/0268304 A1 | 12/2004 | Kuo et al. | 717/109 |
| 2005/0114630 A1 | 5/2005 | Brauneis et al. | 712/220 |
| 2006/0041879 A1* | 2/2006 | Bower et al. | 717/162 |
| 2006/0253831 A1* | 11/2006 | Harper et al. | 717/106 |
| 2007/0101254 A1* | 5/2007 | Sawyer | 715/507 |
| 2008/0301155 A1* | 12/2008 | Borgsmidt | 707/100 |

\* cited by examiner

*Primary Examiner* — Wei Zhen
*Assistant Examiner* — Junchun Wu
(74) *Attorney, Agent, or Firm* — Zilka-Kotab, PC

(57) ABSTRACT

A system, method, and computer program product are provided for propagating an identified data validation error to a user interface. In operation, a data validation error is identified utilizing a data validation rule. Additionally, the data validation error is propagated to a user interface.

22 Claims, 5 Drawing Sheets

US 8,087,003 B1

SYSTEM, METHOD, AND COMPUTER PROGRAM PRODUCT FOR PROPAGATING AN IDENTIFIED DATA VALIDATION ERROR TO A USER INTERFACE

FIELD OF THE INVENTION

The present invention relates to data validation, and more particularly to identifying data validation errors.

BACKGROUND

Currently, data validation corresponding to user interfaces requires specific knowledge of the user interface. This dependency creates issues when generating validation rules or statements for data validation. There is thus a need for addressing these and/or other issues associated with the prior art.

SUMMARY

A system, method, and computer program product are provided for propagating an identified data validation error to a user interface. In operation, a data validation error is identified utilizing a data validation rule. Additionally, the data validation error is propagated to a user interface.

DETAILED DESCRIPTION

Figure 1:
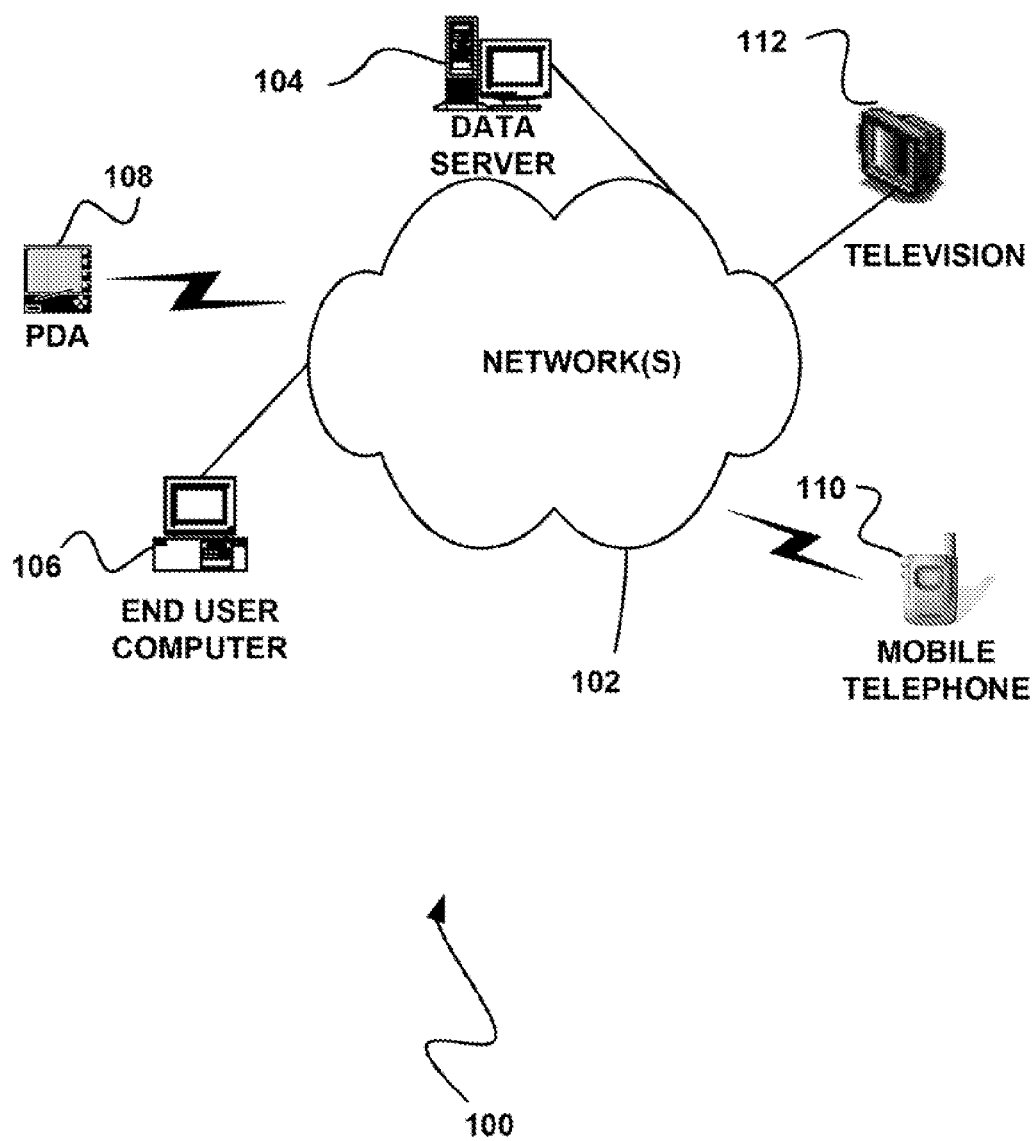
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
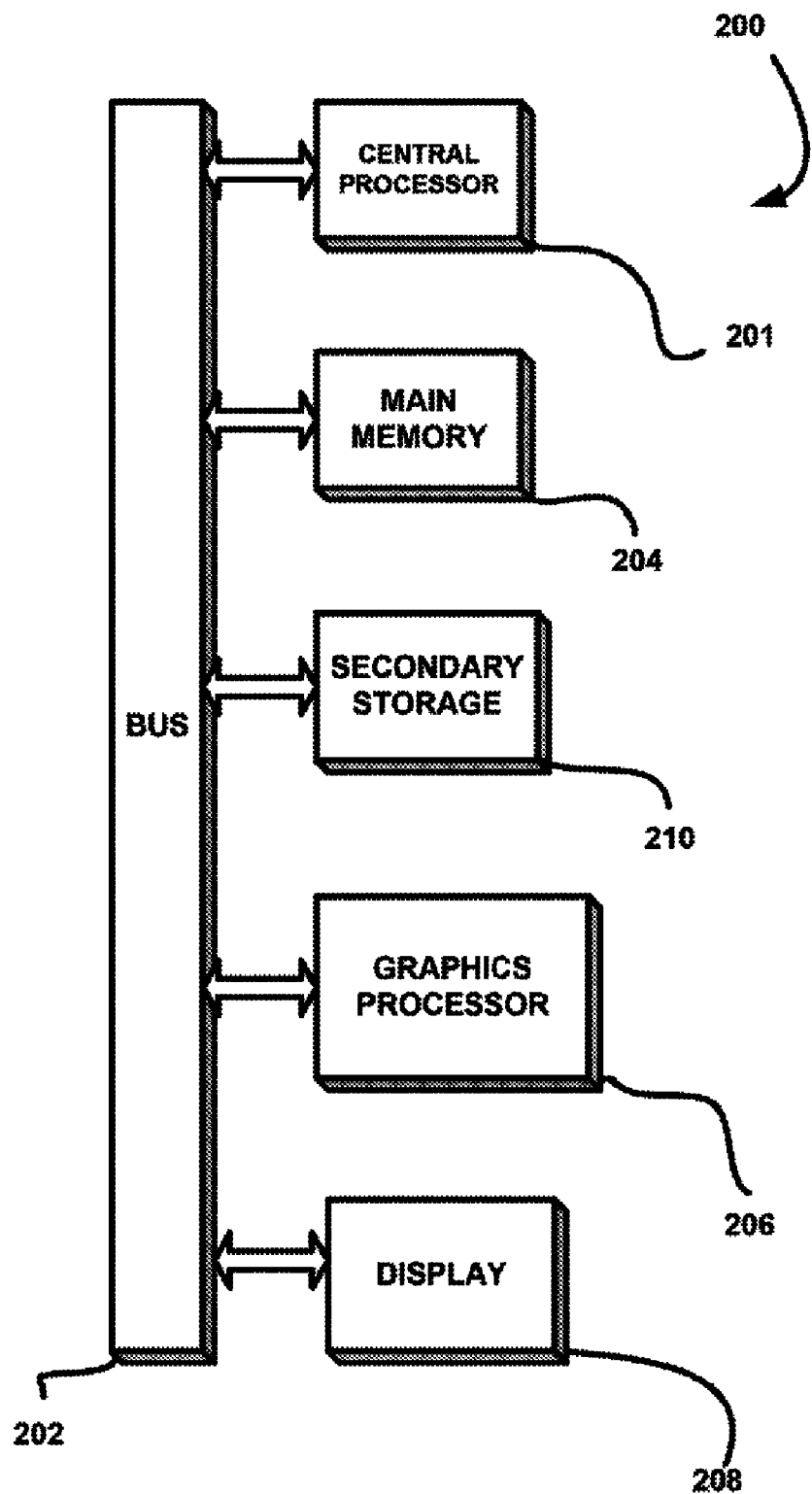
FIG. 2 illustrates an exemplary system, in accordance with one embodiment.

FIG. 2 illustrates an exemplary system 200, in accordance with one embodiment. As an option, the system 200 may be implemented in the context of an of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
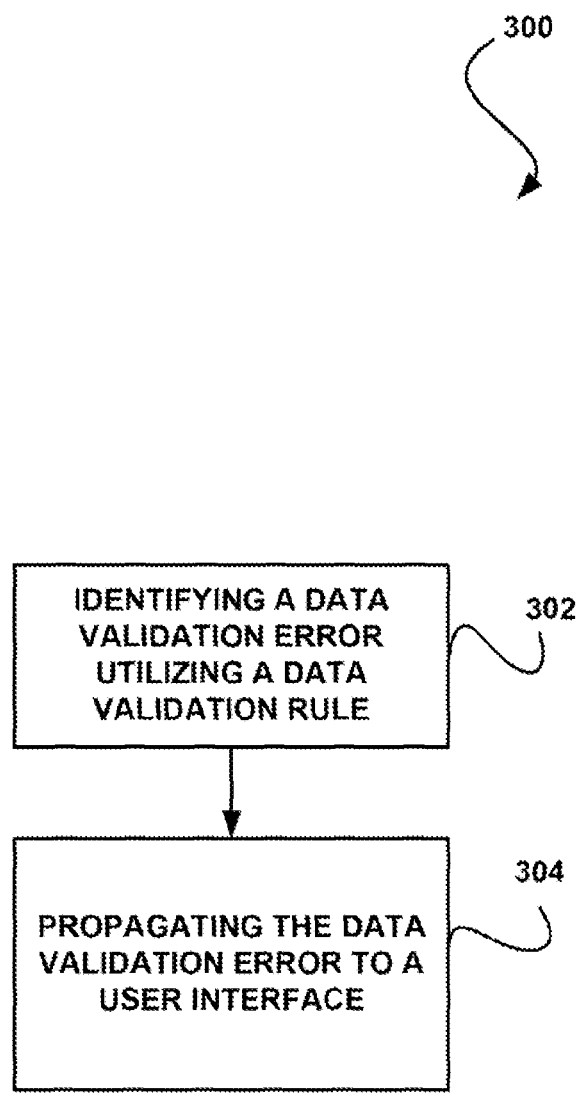
FIG. 3 shows a method for propagating, a data validation error to a user interface, in accordance with one embodiment.

FIG. 3 shows a method 300 for propagating as data validation error to a user interface, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown, a data validation error is identified utilizing a data validation rule. See operation 302. In the context of the present description, as data validation error refers to any error identified utilizing a data validation rule. In one embodiment, the data validation error may be identified based on a failure of the data validation rule.

In the context of the present description, a data validation rule refers to any rule, heuristic, or validation statement used to identify a data validation error or promote data validation. Such data validation rule may be generated using various criteria and/or strategies. In various embodiments, the data validation rule may include, but is not limited to any arithmetic, logical, or relational expression. In one embodiment, the data validation rule may be generated utilizing business logic.

Additionally, the data validation error is propagated to a user interface. See operation 304. Strictly as an option, such propagation may involve the data validation error being displayed on the user interface.

In this case, the data validation error may be displayed in a variety of forms. In one embodiment, the data validation error may be displayed using a graphic user interface (GUI) associated with the user interface. In this case, the GUI may include text describing the validation error.

In another embodiment, the error may be displayed using functionality existing on the user interface (e.g. a visual object, etc.). Of course, the data validation error may be propagated in a variety of forms and should not be limited to the preceding examples. Furthermore, strictly as an option, the validation error may be logged.

In one embodiment, the data validation rule may be defined based on non-user interface data sources. Such non-user interface data sources may include any data source that includes data not suitable for display via the user interface. As an option, the data validation rule may be assigned to an action. In this case, the action may correspond to functionality of the user interface.

In the context of the present description, an action refers to any task that is carried out or is to be carried out. For example, in various embodiments, the action may include, but is not limited to a save action, a load action, a validation action, and/or any other action, for that matter. In one embodiment, the action may correspond to a metadata-driven object defined at design time, which carries out a specific task at runtime. As an option, such action may be user-defined.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
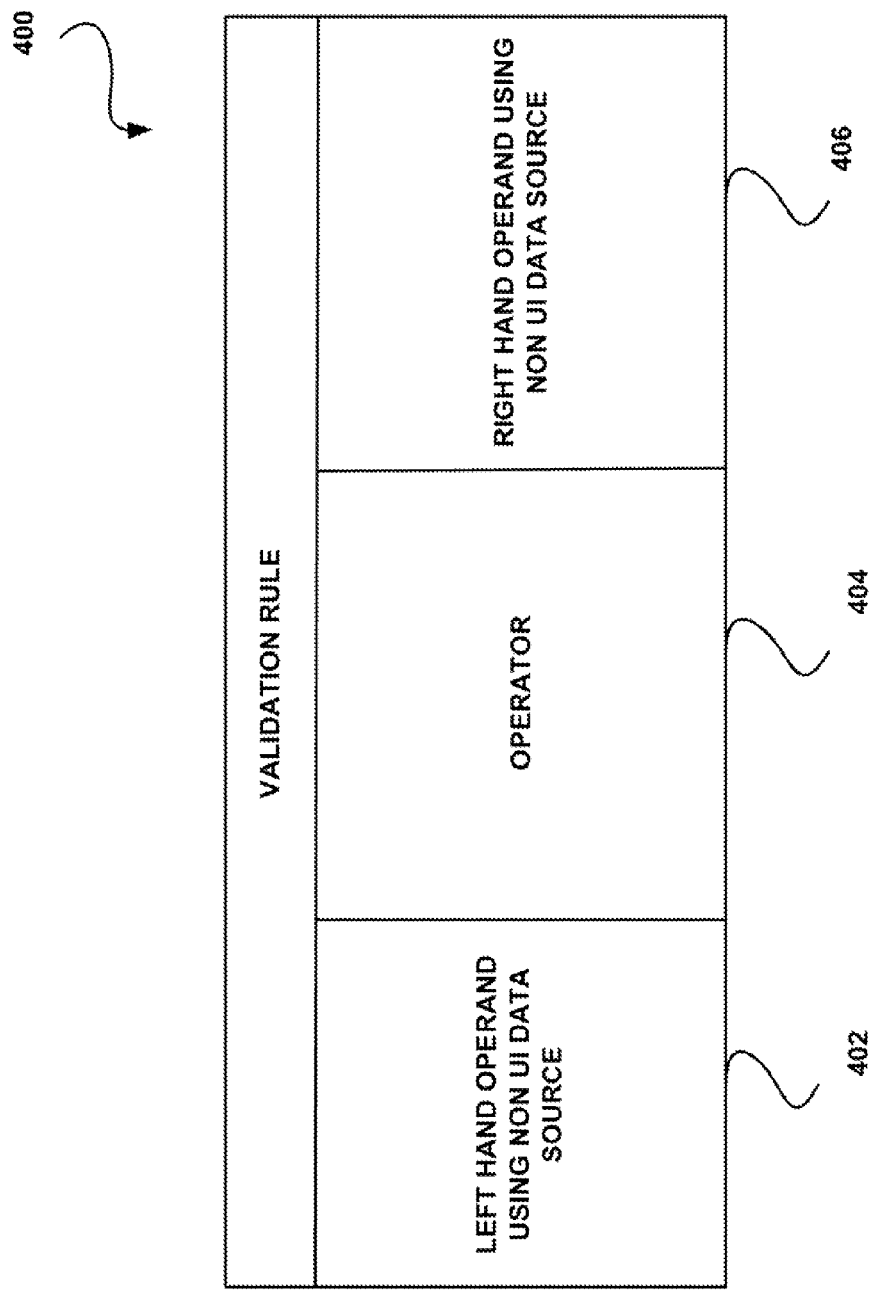
FIG. 4 shows a validation rule for identifying a data validation error, in accordance with one embodiment.

FIG. 4 shows a validation rule 400 for identifying a data validation error, in accordance with one embodiment. As an option, the validation rule 400 may be implemented in the context of the details of FIGS. 1-3. Of course, however, the validation rule 400 may be implemented in the context of any desired environment. Further, the aforementioned definitions may equally apply to the description below.

As shown, the validation rule 400 includes a left hand operand 402, an operator 404, and a right hand operand 406. In operation, the left hand operand 402 and the right hand operand 406 utilize non-user interface (UI) data sources. In the context of the present description, non-UI data sources include any data source that is not a user interface data source.

Furthermore, in various embodiments, the operator 404 may include a logical operator, a relational operator, an arithmetic operator, and/or any other operator. Additionally, in the context of the present description an operand may refer to any input (e.g. argument) from a non-UI data source. Such operands may be evaluated using the operator, for example.

In operation, non-UI data sources corresponding to the left operand 402 and the right operand 406 in the validation rule 400 are mapped to a UI control using data binding information of the UI control. The UI control may be any control corresponding to the UI. For example, in various embodiments the UT control may correspond to a text field, a numeric field, a date field, a list box, a currency field, a button, a check box, and/or any other control corresponding to the UI.

The validation statement 400 is then evaluated if the controls associated with the left operand 402 and the right operand 406 are valid. For example, before evaluation of the validation statement 400, or in conjunction with the evaluation of the validation statement 400, it is determined whether data entered in the UI control, or corresponding to the UI control, passes a control-level, validation. In one embodiment, such control-level validation may include verifying that a numeric entry field does not include alphabetic characters.

In another embodiment, the control-level validation may include verifying that a text entry field does not have numeric characters. In still another embodiment, the control-level validation may include verifying that data is included in a corresponding field. In various other embodiments, any number of control-level validation parameters may be evaluated.

If the control-level validation passes, the validation rule 400 is evaluated. This may involve applying the operator 404 to the left hand operand 402 and the right hand operand 406. For example, if the left hand operand 402 is represented by "X," and the right hand operand 406 is represented by "Y," the validation rule "X operator Y" is evaluated.

In the case that the operator 404 is a relational, operator such as a "GREATER THAN" operator, the evaluation of "X GREATER THAN Y" may return true or false, either indicating a failure or a success of the validation rule 400. It should be noted that either return value of the validation rule evaluation may correspond to either a pass or a failure depending on the configuration. If the control-level validation fails and/ or if the validation rule 400 evaluates as false, an error may be propagated to the UI control which is mapped to the left hand operand 402.

For example, if the validation rule "X GREATER THAN Y" returns a value of false, and false indicates a failure of the validation rule, an error is propagated to the UI control which is mapped to "X." It should be noted that, in other embodiments, the error may be propagated to any number of UI controls. In one embodiment, the destination of the error propagation may be determined during the generation of the validation rule 400.

In one embodiment, the validation rule 400 may be associated with an action. For example, a UI may include functionality corresponding to a plurality of actions. For example, in various embodiments, such actions may include, but are not limited to a save action, a load action, a submit action, a launch action, a bulk action, a sequence action, a subscribing action, a service driven UI action, a process driven UI action, and/or any other action that meets the above definition.

As an option, the UI may include action controls which target a specific action or actions. For example, the UI may include a button which corresponds to an action. Similarly, the UI may include a checkbox which corresponds to action.

Furthermore, the action may correspond to a UI control or multiple UI controls. In one embodiment, the action may correspond to a metadata-driven object defined at design time, which carries out a specific task at runtime. As an option, each action may include a unique metadata format.

It should be noted that the validation rule 400 may be utilized for various types of validation, depending on the context. As noted above, the validation rule 400 may be defined in terms of general non-UI data sources. As an option, general business logic may be utilized to define the validation rule 400.

Furthermore, utilizing operands to define data validation in terms of business logic, or a sustained logic, allows a more general approach to rule definition rather than defining, in terms of frequently changing UI logic. Still yet, validation errors may be propagated to the UI or the UI controls at runtime. Additionally, data architects may be able to define the data validation rules without knowing the details of the UI.

For example, data binding information may be utilized to relate validation errors to UI controls. In the context of the present description, data binding refers to any process of representing information in a document, UI, or form as an object in memory. In this case, data binding allows access to data from the object.

As an option, the UI may display the validation errors. Such display may include displaying an error dialog box. In various embodiments, the dialog box may include a title specifying that a validation error is present, detailed text information about the error, collapsible text relating to the error, as well as buttons to close, abort, and optionally send an email to system administrator.

As an additional option, the validation errors may be logged. For example, the validation errors may be logged and stored in a database. The information logged may include an image of the validation error presented on the UI and/or any information relating to the validation error which may be stored as text or binary data.

It should be noted that multiple validation rules may be applied to a given action. Each validation rule may independently pass or fail. An error is generated for all validation rules that fail. Since it is possible that multiple validation rules for the same action fail, it is therefore possible that a single UI control associated with more than one left-hand operand X generates multiple errors.

In one embodiment, the complete set of validation rules may be set as a property of an action. This validation rule set may be quite long in certain cases. In one embodiment, a validation property may have a corresponding button that will launch a validation rule editor window. In this case, the validation rule editor window may include a multi-line text window that allows editing and/or addition of multiple validation rules.

Figure 5:
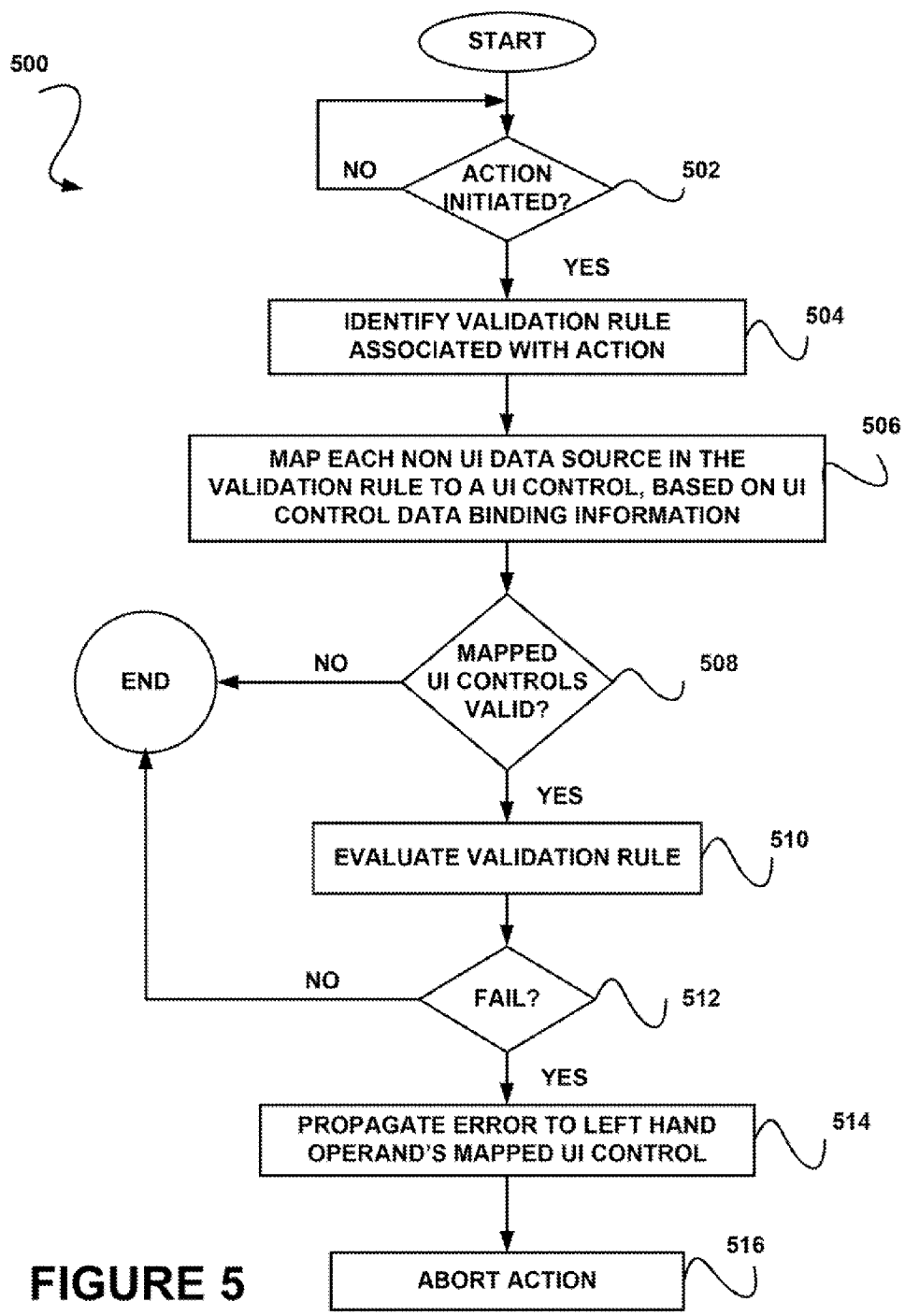
FIG. 5 shows a method for propagating a data validation error to a user interface, in accordance with another embodiment.

FIG. 5 shows a method 500 for propagating a data validation error to a user interface, in accordance with one embodiment. As an option, the method 500 may be implemented in the context of the details of FIGS. 1-4. Of course, however, the method 500 may be carried out in any desired environment. Again, the aforementioned definitions may equally apply to the description below.

As shown, it is determined whether an action is initiated. See decision 502. In one embodiment, the action may include any task carried out at run-time.

In one embodiment, the action may be initiated using functionality on a UI. In this case, such functionality may include a button, a selection box (e.g. a check box, etc.), and/or any other functionality capable of initiating the action. In one embodiment, the action may include a save or a load command. In this case, the save or load command may correspond to a save or load button.

If it is determined that an action has been initiated, a validation rule associated with the action is identified. See operation 504. In one embodiment, the validation rule may be defined in extended markup language (XML). Furthermore, the validation rule may be defined by operands corresponding to data sources other than UI data sources.

As an option, validation rule may be defined in terms of data sources included in a form. In such case, the UI may include the form. In the context of the present description, a form may include any form utilized for creating data, such as documents, reports, etc. In one embodiment, the form may be defined in XML.

In one example, the form may include a template. In another example, the form may be a base form. To this end, the form may be capable of being utilized as a basis for creating, another form (e.g. customized form, etc.).

In one embodiment, the form may include a user interface form. For example, a user interface may be capable of being created utilizing (e.g. based on, etc.) the form. In another embodiment, the form may include a report form, for example, such that a report may be created utilizing the form. Of course, in other embodiments, the form may be capable of being utilized for creating, any desired document, code, image, page, display screen, etc.

As an option, the validation rule may be defined at design time using metadata (e.g. design time properties). In this case, various editors may be utilized to define the validation rule (e.g. form editor, etc.). Of course, the validation rule may be defined in any number of ways. Strictly as an option, the UI may include an attribute for defining or modifying the validation rules. Strictly as an option, business logic definitions, residing externally to this system, but associated to the action being executed, may be used to define the validation rules.

Furthermore, the validation rule set may include any number of individual validation rules. Each validation rule in the set is evaluated independently. In one embodiment, the validation rule may include a left hand operand, a right hand operand, and an operator. In this case, the right and the left hand operator may include any non-UI data source. In various embodiments, the operator may include a logical operator, a relational operator, an arithmetic operator, and/or any other operator.

Once a validation rule associated with the action has been identified, each non-UI data source in the validation rule is then mapped to a UI control, based on UI control data binding information. See operation 506. In the context of the present description, a non-UI data source may refer to any data source that is not part of the UI. Furthermore, UI control data binding information refers to information relating to how the UI control binds to a data source.

Once the UI data sources have been mapped, it is determined whether the mapped UI controls are valid. See decision 508. In other words, it is determined whether data mapped to the UI control passed a control-level validation. Such control level validation may include determining whether alphabetic characters have been mapped to a numeric entry field, numbers have been mapped to an alphabetic character field, a character length threshold has been violated, etc.

If the mapped UI controls are determined to be invalid, a failure is recognized. As an option, information relating, to the failure may be relayed to the UI. In this case, such information may optionally be displayed. In one embodiment, the information may be propagated to the corresponding UI control.

If the mapped UI controls are determined to be valid, the validation rule is evaluated. See operation 510. In other words, the operands and the operator included in the validation rule may be evaluated to determine a success or failure. In one embodiment, the success or failure may be determined based on whether the validation rule returned a "true" or "false" value.

Once the validation rule is evaluated, it is determined whether the evaluation of the validation rule results in a failure. See decision 512. If the evaluation of the validation rule results in a success, the action is executed.

On the other hand, if there was a failure, an error is propagated to the left hand operand's mapped UI control. See operation 514. For example, for the validation rule "X GREATER THAN Y," a failure would result in an error being propagated to a UI control mapped to "X." It should be noted that in various embodiments, the validation error may be mapped to different UI controls.

For example, in the case that the action included a save action, the save action would be aborted. At this point, a user may utilize the validation error information and potentially remedy the error. As an option, the action may be re-initiated upon a correction of the error.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

mapping non-user interface data sources, each of the non-user interface data sources corresponding to at least one of a left hand operand of a data validation rule and a right hand operand of the data validation rule, to a user interface control using data binding information of the user interface control;

evaluating the data validation rule to determine that each user interface control associated with the left hand operand and the right hand operand are valid and pass a control-level validation;

identifying a data validation error utilizing the data validation rule, the identifying of the data validation error including applying an operator to both the left hand operand and the right hand operand utilizing the respective non-user interface data sources; and propagating the data validation error to a user interface control which is mapped to the left hand operand, if the control-level validation fails and/or if the validation rule evaluates as false;

wherein the data validation rule is generated utilizing business logic.

2. The method of claim 1, wherein the data validation rule is defined, based on the non-user interface data sources.

3. The method of claim 1, further comprising assigning the data validation rule to an action.

4. The method of claim 3, wherein the action corresponds to functionality on the user interface.

5. The method of claim 3, wherein the action is associated with the user interface.

6. The method of claim 5, wherein the user interface includes a form.

7. The method of claim 1, wherein the data validation error is identified, in response to a failure of the data validation rule.

8. The method of claim 1, further comprising presenting the data validation error via the user interface.

9. The method of claim 1, further comprising aborting an action associated with the data validation rule.

10. The method of claim 1, wherein the data validation rule is defined utilizing an extended markup language (XML).

11. The method of claim 1, wherein the data validation error is propagated to the user interface control at runtime.

12. The method of claim 1, further comprising identifying an initiated action associated with the data validation rule.

13. The method of claim 1, further comprising evaluating the data validation rule, in response to a determination that the user interface is valid.

14. A computer program product embodied on a non-transitory computer readable medium, comprising:

computer code for mapping non-user interface data sources, each of the non-user interface data sources corresponding to at least one of a left hand operand of a data validation rule and a right hand operand of the data validation rule, to a user interface control using data binding information of the user interface control;

computer code for evaluating the data validation rule to determine that each user interface control associated with the left hand operand and the right hand operand are valid and pass a control-level validation;

computer code for identifying a data validation error utilizing the data validation rule, the identifying of the data validation error including applying an operator to both the left hand operand and the right hand operand utilizing the respective non-user interface data sources; and computer code for propagating the data validation error to a user interface control which is mapped to the left hand operand, if the control-level validation fails and/or if the validation rule evaluates as false;

wherein the computer program product is operable such that the data validation rule is generated utilizing business logic.

15. A system, comprising:

a processor for:

mapping non-user interface data sources, each of the non-user interface data sources corresponding to at least one of a left hand operand of a data validation rule and a right hand operand of the data validation rule, to a user interface control using data binding information of the user interface control;

evaluating the data validation rule to determine that each user interface control associated with the left hand operand and the right hand operand are valid and pass a control-level validation;

identifying a data validation error utilizing the data validation rule, the identifying of the data validation error including applying an operator to both the left hand operand and the right hand operand utilizing the respective non-user interface data sources; and propagating the data validation error to a user interface control which is mapped to the left hand operand, if the control-level validation fails and/or if the validation rule evaluates as false;

wherein the system is operable such that the data validation rule is generated utilizing business logic.

16. The system of claim 15, wherein the processor is coupled to memory via a bus.

17. The method of claim 3, wherein the action includes a load action.

18. The method of claim 3, wherein the action corresponds to a metadata-driven object defined at design time, which carries out a specific task at runtime.

19. The method of claim 1, wherein the data validation error is logged and stored in a database, the logging and storing of the data validation error including saving an image of the data validation error propagated to the user interface control.

20. The method of claim 6, wherein the data validation rule is defined in terms of at least one data source included in the form.

21. The method of claim 6, wherein the form includes a user interface form for creating a user interface utilizing the form.

22. The method of claim 1, wherein the data validation rule includes at least two individual data validation rules, each individual data validation rule being evaluated independently for identifying the data validation error.

* * * * *